US012660029B2

(12) United States Patent
Liu et al.

(10) Patent No.: US 12,660,029 B2
(45) Date of Patent: Jun. 16, 2026

(54) PARTIAL FREQUENCY SOUNDING

(71) Applicant: Lenovo (Beijing) Limited, Beijing (CN)

(72) Inventors: Bingchao Liu, Beijing (CN); Chenxi Zhu, Beijing (CN); Wei Ling, Beijing (CN); Yi Zhang, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 308 days.

(21) Appl. No.: 18/553,706

(22) PCT Filed: Apr. 6, 2021

(86) PCT No.: PCT/CN2021/085616
§ 371 (c)(1),
(2) Date: Oct. 2, 2023

(87) PCT Pub. No.: WO2022/213254
PCT Pub. Date: Oct. 13, 2022

(65) Prior Publication Data
US 2024/0188170 A1     Jun. 6, 2024

(51) Int. Cl.
*H04W 76/20* (2018.01)
*H04L 5/00* (2006.01)
*H04W 80/02* (2009.01)

(52) U.S. Cl.
CPC .......... *H04W 76/20* (2018.02); *H04L 5/0051* (2013.01); *H04W 80/02* (2013.01)

(58) Field of Classification Search
None
See application file for complete search history.

(56) References Cited

U.S. PATENT DOCUMENTS

2020/0177535 A1    6/2020  Kim et al.
2022/0330218 A1*  10/2022  Abdelghaffar ........ H04L 5/0048
(Continued)

FOREIGN PATENT DOCUMENTS

CN      111213417 A     5/2020
WO    2022126148 A2     6/2022
(Continued)

OTHER PUBLICATIONS

CATT , "On enhancements on SRS flexibility, coverage and capacity", 3GPP TSG RAN WG1 #103-e, R1-2007829, e-Meeting [retrieved Dec. 5, 2023]. Retrieved from the Internet <https://www.3gpp.org/ftp/tsg_ran/WG1_RL1/TSGR1_103-e/Docs>, Oct. 2020, 9 pages.
(Continued)

*Primary Examiner* — Diane L Lo
(74) *Attorney, Agent, or Firm* — FIG. 1 Patents

(57) ABSTRACT

Methods and apparatuses for are disclosed. A method comprises receiving a MAC CE indicating a $P_F$ value and a value indicating a starting position $k_{offset}$ in frequency domain for a SRS resource: and transmitting the SRS resource in $m_P$ contiguous resource blocks starting from $k_0^{(p^i)}+k_{offset}$, where $m_P$ is the largest integer that is equal to or smaller than (I), wherein $m_{SRS,B_{SRS}}$ is the allocated sounding frequency band of the SRS resource configured by RRC signaling, and $k_0^{(p^i)}$ is the start position of the SRS resource determined by RRC signaling.

$$\left[\frac{1}{P_F}m_{SRS,B_{SRS}}\right] \tag{I}$$

20 Claims, 4 Drawing Sheets

600

Start

602 — receiving a MAC CE indicating a $P_f$ value and a value indicating a starting position offset in frequency domain for a SRS resource 604 — transmitting the SRS resource in $m_P$ contiguous resource blocks starting from the start position of the SRS resource determined by RRC signaling plus the starting position offset, where $m_P$ is the largest integer that is equal to or smaller than the allocated sounding frequency band of the SRS resource configured by RRC signaling divided by the $P_f$ value End

(56) References Cited

U.S. PATENT DOCUMENTS

| 2023/0111063 | A1* | 4/2023 | Ji | ......................... H04L 5/0012 |
| | | | | 370/329 |
| 2023/0117977 | A1* | 4/2023 | Sun | ...................... H04L 5/0048 |
| | | | | 370/329 |
| 2023/0239843 | A1* | 7/2023 | Liu | ...................... H04L 5/0096 |
| | | | | 370/329 |
| 2023/0344590 | A1* | 10/2023 | Manolakos | ........... H04L 5/0051 |
| 2024/0031103 | A1* | 1/2024 | Liu | ...................... H04L 5/0051 |

FOREIGN PATENT DOCUMENTS

| WO | 2022205486 A1 | 10/2022 |
| WO | 2022213227 A1 | 10/2022 |

OTHER PUBLICATIONS

OPPO , "Enhancements on SRS flexibility, coverage and capacity", 3GPP TSG RAN WG1 #104-e, R1-2100123, e-Meeting [retrieved Dec. 5, 2023]. Retrieved from the Internet <https://www.3gpp.org/ftp/TSG_RAN/WG1_RL1/TSGR1_104-e/Docs/>, Jan. 2021, 9 pages.

PCT/CN2021/085616 , "International Preliminary Report on Patentability", PCT Application No. PCT/CN2021/085616, Oct. 19, 2023, 5 pages.

PCT/CN2021/085616 , "International Search Report and Written Opinion", PCT Application No. PCT/CN2021/085616, Jan. 6, 2022, 6 pages.

"Extended European Search Report", EP Application No. 21935491. 7, Dec. 4, 2024, 13 pages.

Lenovo, et al., "Enhancements on SRS", 3GPP TSG RAN WG1#104-e, R1-2100277, e-Meeting, Jan. 2021, 10 pages.

* cited by examiner (a) Full frequency sounding     (b) Partial frequency sounding

600

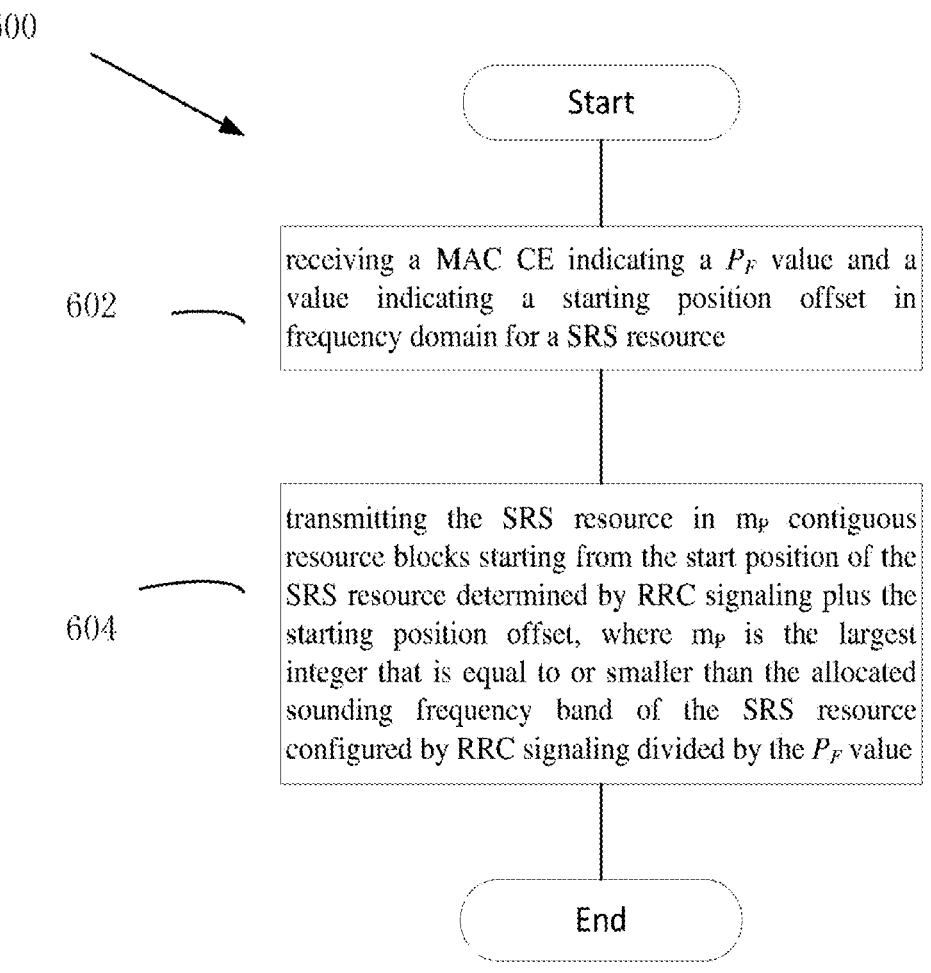

Start

602 receiving a MAC CE indicating a $P_F$ value and a value indicating a starting position offset in frequency domain for a SRS resource

604 transmitting the SRS resource in $m_P$ contiguous resource blocks starting from the start position of the SRS resource determined by RRC signaling plus the starting position offset, where $m_P$ is the largest integer that is equal to or smaller than the allocated sounding frequency band of the SRS resource configured by RRC signaling divided by the $P_F$ value End

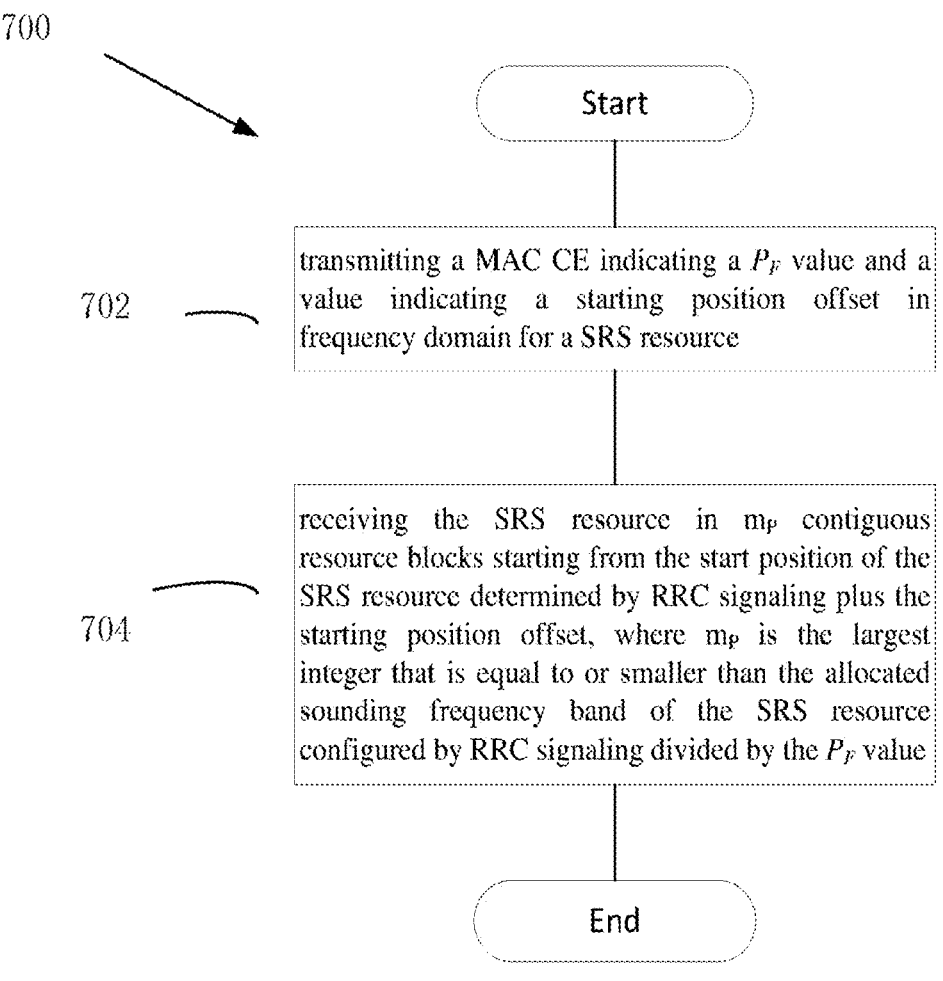

Start

702 — transmitting a MAC CE indicating a $P_F$ value and a value indicating a starting position offset in frequency domain for a SRS resource 704 — receiving the SRS resource in $m_P$ contiguous resource blocks starting from the start position of the SRS resource determined by RRC signaling plus the starting position offset, where $m_P$ is the largest integer that is equal to or smaller than the allocated sounding frequency band of the SRS resource configured by RRC signaling divided by the $P_F$ value End

Figure 7

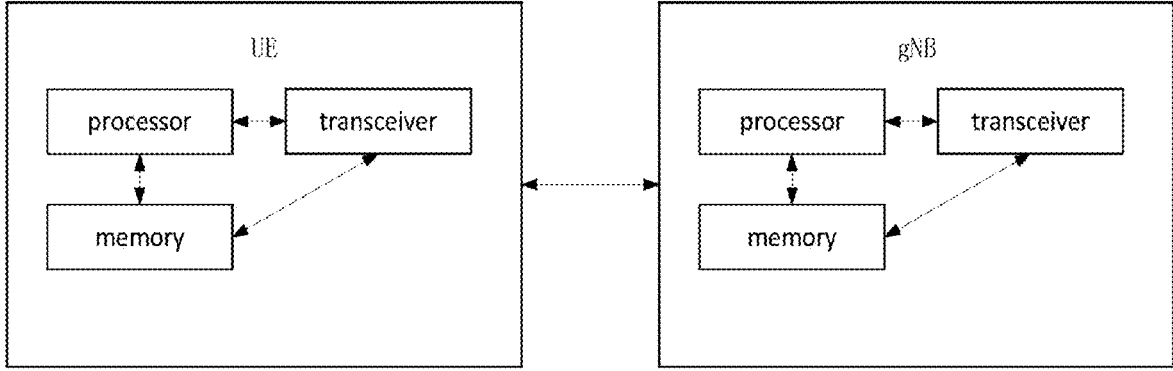

UE
processor     transceiver
memory gNB
processor     transceiver
memory

Figure 8

PARTIAL FREQUENCY SOUNDING

FIELD

The subject matter disclosed herein generally relates to wireless communications, and more particularly relates to methods and apparatuses for partial frequency sounding.

BACKGROUND

The following abbreviations are herewith defined, at least some of which are referred to within the following description: New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Evolved Node B (eNB), Next Generation Node B (gNB), Uplink (UL), Downlink (DL), Central Processing Unit (CPU), Graphics Processing Unit (GPU), Field Programmable Gate Array (FPGA), Orthogonal Frequency Division Multiplexing (OFDM), Radio Resource Control (RRC), User Entity/ Equipment (Mobile Terminal), Transmitter (TX), Receiver (RX), Sounding Reference Signal (SRS), Downlink control information (DCI), Media Access Control (MAC), MAC control element (MAC CE), Radio Resource Control (RRC), Resource Block (RB), frequency range 2 (FR2): indicating a frequency range of 24.25 GHZ~52.6 GHz.

Basic SRS function is specified in NR Release 15. The SRS function is enhanced in NR Release 16 to support high efficiency operation in FR2.

SRS resource can be configured as aperiodic SRS, semi-persistent SRS or periodic SRS. Aperiodic SRS resource can be triggered by DCI (e.g. DCI format 0_1 or DCI format 1_1) with a non-zero 'SRS request' field. Semi-persistent SRS resource is activated or deactivated by a Semi-persistent SRS Activation/Deactivation MAC CE. Periodic SRS resource can be triggered by a higher layer signaling (e.g. RRC signaling).

The SRS capacity, especially for the UE with lower mobility and small delay spread, needs to be improved. One way to improve the SRS capacity is partial frequency sounding, which means that the SRS resource(s) is only transmitted on partial frequency band of the allocated frequency resources in a sounding hop.

Traditionally, the frequency resources used for a SRS resource is determined by the number of RBs ($m_{SRS,B_{SRS}}$). The number of RBs ($m_{SRS,B_{SRS}}$) is determined by the RRC parameter $C_{SRS}$ and $B_{SRS}$ configured per SRS resource, as illustrated in Table 1.

TABLE 1

| C_SRS | B_SRS = 0 | | B_SRS =1 | | B_SRS = 2 | | B_SRS = 3 | |
|---|---|---|---|---|---|---|---|---|
| | m_SRS, 0 | N_0 | m_SRS, 1 | N_1 | m_SRS, 2 | N_2 | m_SRS, 3 | N_3 |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |

TABLE 1-continued

| C_SRS | B_SRS = 0 | | B_SRS =1 | | B_SRS = 2 | | B_SRS = 3 | |
|---|---|---|---|---|---|---|---|---|
| | m_SRS, 0 | N_0 | m_SRS, 1 | N_1 | m_SRS, 2 | N_2 | m_SRS, 3 | N_3 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 20 | 3 | 4 | 5 | 4 | 1 |
| 17 | 64 | 1 | 32 | 2 | 16 | 2 | 4 | 4 |
| 18 | 72 | 1 | 24 | 3 | 12 | 2 | 4 | 3 |
| 19 | 72 | 1 | 36 | 2 | 12 | 3 | 4 | 3 |
| 20 | 76 | 1 | 4 | 19 | 4 | 1 | 4 | 1 |
| 21 | 80 | 1 | 40 | 2 | 20 | 2 | 4 | 5 |
| 22 | 88 | 1 | 44 | 2 | 4 | 11 | 4 | 1 |
| 23 | 96 | 1 | 32 | 3 | 16 | 2 | 4 | 4 |
| 24 | 96 | 1 | 48 | 2 | 24 | 2 | 4 | 6 |
| 25 | 104 | 1 | 52 | 2 | 4 | 13 | 4 | 1 |
| 26 | 112 | 1 | 56 | 2 | 28 | 2 | 4 | 7 |
| 27 | 120 | 1 | 60 | 2 | 20 | 3 | 4 | 5 |
| 28 | 120 | 1 | 40 | 3 | 8 | 5 | 4 | 2 |
| 29 | 120 | 1 | 24 | 5 | 12 | 2 | 4 | 3 |
| 30 | 128 | 1 | 64 | 2 | 32 | 2 | 4 | 8 |
| 31 | 128 | 1 | 64 | 2 | 16 | 4 | 4 | 4 |
| 32 | 128 | 1 | 16 | 8 | 8 | 2 | 4 | 2 |
| 33 | 132 | 1 | 44 | 3 | 4 | 11 | 4 | 1 |
| 34 | 136 | 1 | 68 | 2 | 4 | 17 | 4 | 1 |
| 35 | 144 | 1 | 72 | 2 | 36 | 2 | 4 | 9 |
| 36 | 144 | 1 | 48 | 3 | 24 | 2 | 12 | 2 |
| 37 | 144 | 1 | 48 | 3 | 16 | 3 | 4 | 4 |
| 38 | 144 | 1 | 16 | 9 | 8 | 2 | 4 | 2 |
| 39 | 152 | 1 | 76 | 2 | 4 | 19 | 4 | 1 |
| 40 | 160 | 1 | 80 | 2 | 40 | 2 | 4 | 10 |
| 41 | 160 | 1 | 80 | 2 | 20 | 4 | 4 | 5 |
| 42 | 160 | 1 | 32 | 5 | 16 | 2 | 4 | 4 |
| 43 | 168 | 1 | 84 | 2 | 28 | 3 | 4 | 7 |
| 44 | 176 | 1 | 88 | 2 | 44 | 2 | 4 | 11 |
| 45 | 184 | 1 | 92 | 2 | 4 | 23 | 4 | 1 |
| 46 | 192 | 1 | 96 | 2 | 48 | 2 | 4 | 12 |
| 47 | 192 | 1 | 96 | 2 | 24 | 4 | 4 | 6 |
| 48 | 192 | 1 | 64 | 3 | 16 | 4 | 4 | 4 |
| 49 | 192 | 1 | 24 | 8 | 8 | 3 | 4 | 2 |
| 50 | 208 | 1 | 104 | 2 | 52 | 2 | 4 | 13 |
| 51 | 216 | 1 | 108 | 2 | 36 | 3 | 4 | 9 |
| 52 | 224 | 1 | 112 | 2 | 56 | 2 | 4 | 14 |
| 53 | 240 | 1 | 120 | 2 | 60 | 2 | 4 | 15 |
| 54 | 240 | 1 | 80 | 3 | 20 | 4 | 4 | 5 |
| 55 | 240 | 1 | 48 | 5 | 16 | 3 | 8 | 2 |
| 56 | 240 | 1 | 24 | 10 | 12 | 2 | 4 | 3 |
| 57 | 256 | 1 | 128 | 2 | 64 | 2 | 4 | 16 |
| 58 | 256 | 1 | 128 | 2 | 32 | 4 | 4 | 8 |
| 59 | 256 | 1 | 16 | 16 | 8 | 2 | 4 | 2 |
| 60 | 264 | 1 | 132 | 2 | 44 | 3 | 4 | 11 |
| 61 | 272 | 1 | 136 | 2 | 68 | 2 | 4 | 17 |
| 62 | 272 | 1 | 68 | 4 | 4 | 17 | 4 | 1 |
| 63 | 272 | 1 | 16 | 17 | 8 | 2 | 4 | 2 |

It has been agreed to support that the UE only transmit the SRS resource in $m_P$ ($m_P$ is the largest integer that is equal to or smaller than $$\left\lfloor \frac{1}{P_F} m_{SRS,B_{SRS}} \right\rfloor$$

contiguous RBs in one OFDM symbol, where $m_{SRS,B_{SRS}}$ indicates the number of RBs for a sounding hop configured by RRC signaling, $P_F$ is a number that is larger than 1 (e.g. 2, 4 or 8) so that only partial frequency band is used to transmit the SRS resource.

This disclosure targets the detailed signaling mechanism to determine the partial frequency band (e.g. determined by $P_F$ value) and the start location of the partial frequency band.

BRIEF SUMMARY

Methods and apparatuses for partial frequency sounding are disclosed.

In one embodiment, a method comprises receiving a MAC CE indicating a $P_F$ value and a value indicating a starting position offset $k_{offset}$ in frequency domain for a SRS resource; and transmitting the SRS resource in $m_P$ contiguous resource blocks starting from $$k_0^{(p_i)} + k_{offset},$$

where $m_P$ is the largest integer that is equal to or smaller than $$\left\lfloor \frac{1}{P_F} m_{SRS,B_{SRS}} \right\rfloor,$$

wherein $m_{SRS,B_{SRS}}$ is the allocated sounding frequency band of the SRS resource configured by RRC signaling, and $$k_0^{(p_i)}$$

is the start position of the SRS resource determined by RRC signaling.

In one embodiment, the $P_F$ value is one of multiple $P_F$ values configured by RRC signaling. The $P_F$ value is indicated by a $P_F$ field with a bit length determined by $\lceil \log_2 (N_{P_F}) \rceil$, where $N_{P_F}$ is the number of the multiple $P_F$ values.

In another embodiment, the starting position offset $k_{offset}$ may be determined by the number of resource blocks ($N_{offset}$) indicated by an $N_{offset}$ field, where $$k_{offset} = N_{offset} \times N_{sc}^{RB},$$

where $$N_{sc}^{RB}$$

is the number of subcarriers per resource block. $N_{offset}$ is no more than $$\frac{\hat{P}_F - 1}{\hat{P}_F} m_{SRS,B_{SRS}},$$

where $\hat{P}_F$ is the indicated $P_F$ value. Alternatively, the starting position offset $k_{offset}$ may be indicated by the number of $m_P$ resource blocks ($M_{offset}$) indicated by an $M_{offset}$ field with a bit length determined by $\lceil \log_2(\max(P_F)) \rceil$, where $$k_{offset} = M_{offset} \times m_P \times N_{sc}^{RB},$$

where $$N_{sc}^{RB}$$

is the number of subcarriers per resource block, $M_{offset}$ is one of $0, 1, \ldots,$ and $\hat{P}_F - 1$, where $\hat{P}_F$ is the $P_F$ value indicated by the $P_F$ field.

In some embodiment, the $P_F$ value and the value indicating $k_{offset}$ may apply to all SRS resources within the SRS resource set indicated by a SRS resource set ID field contained in the MAC CE.

In some embodiment, the $P_F$ value and the value indicating $k_{offset}$ may apply to the SRS resource indicated by a SRS resource ID field contained in the MAC CE. Alternatively, the $P_F$ value and the value indicating $k_{offset}$ may apply to all SRS resources contained in the SRS resource set containing the SRS resource indicated by a SRS resource ID field contained in the MAC CE.

In one embodiment, a method comprises transmitting a MAC CE indicating a $P_F$ value and a value indicating a starting position offset $k_{offset}$ in frequency domain for a SRS resource; and receiving the SRS resource in $m_P$ contiguous resource blocks starting from $$k_0^{(p_i)} + k_{offset},$$

where $m_P$ is the largest integer that is equal to or smaller than $$\left\lfloor \frac{1}{P_F} m_{SRS,B_{SRS}} \right\rfloor,$$

wherein $m_{SRS,B_{SRS}}$ is the allocated sounding frequency band of the SRS resource configured by RRC signaling, and $$k_0^{(p_i)}$$

is the start position of the SRS resource determined by RRC signaling.

In another embodiment, a remote unit comprises a receiver that receives a MAC CE indicating a $P_F$ value and a value indicating a starting position offset $k_{offset}$ in frequency domain for a SRS resource; and a transmitter that transmits the SRS resource in $m_P$ contiguous resource blocks starting from $$k_0^{(p_i)} + k_{offset},$$

where $m_P$ is the largest integer that is equal to or smaller than $$\left\lfloor \frac{1}{P_F} m_{SRS,B_{SRS}} \right\rfloor,$$

wherein $m_{SRS,B_{SRS}}$ is the allocated sounding frequency band of the SRS resource configured by RRC signaling, and $$k_0^{(p_i)}$$

is the start position of the SRS resource determined by RRC signaling.

In yet another embodiment, a base unit comprises a transmitter that transmits a MAC CE indicating a $P_F$ value and a value indicating a starting position offset $k_{offset}$ in frequency domain for a SRS resource; and a receiver that receives the SRS resource in $m_P$ contiguous resource blocks starting from $$k_0^{(p_i)} + k_{offset},$$

where $m_P$ is the largest integer that is equal to or smaller than $$\left\lfloor \frac{1}{P_F} m_{SRS,B_{SRS}} \right\rfloor,$$

wherein $m_{SRS,B_{SRS}}$ is the allocated sounding frequency band of the SRS resource configured by RRC signaling, and $$k_0^{(p_i)}$$

is the start position of the SRS resource determined by RRC signaling.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which:

FIG. 6 is a schematic flow chart diagram illustrating an embodiment of a method;

FIG. 7 is a schematic flow chart diagram illustrating a further embodiment of a method; and FIG. 8 is a schematic block diagram illustrating apparatuses according to one embodiment.

DETAILED DESCRIPTION

Figure 1:
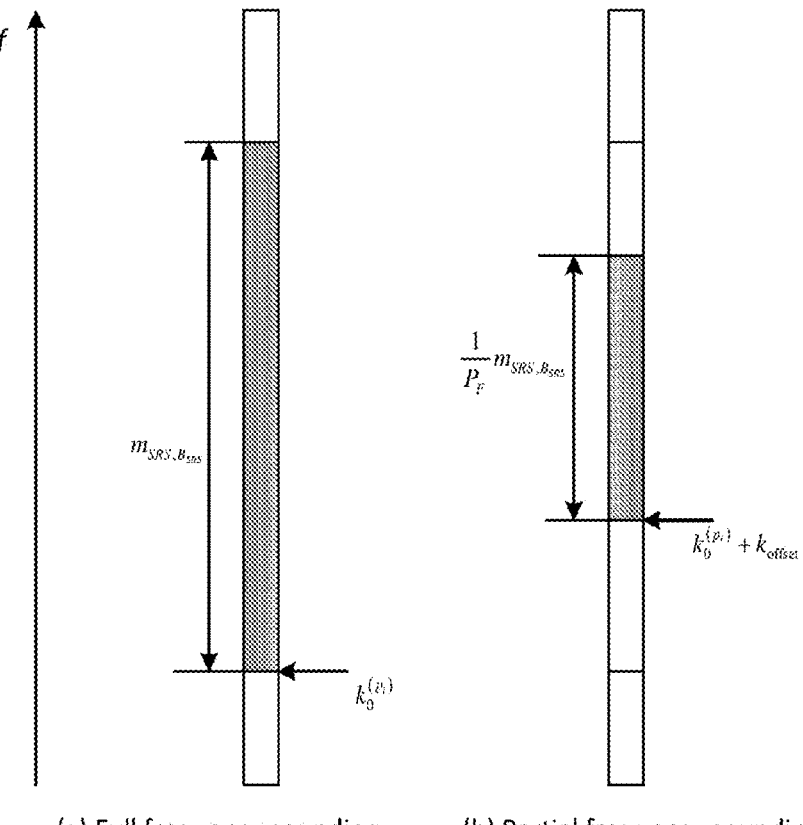
FIG. 1 illustrates a comparison between full frequency resources and partial frequency resources for a SRS resource.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including". "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code.

This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

FIG. 1 illustrates the comparison between full frequency resources and partial frequency resources for a SRS resource.

In the left part of FIG. 1 labeled as "(a) Full frequency sounding", the frequency resources used for a SRS resource with SRS antenna port $p_i$ are determined by a starting position $$k_0^{(p_i)}$$

in frequency domain and the allocated sounding frequency band (maybe referred to as "full sounding frequency band") that is calculated based on the number of RBs ($m_{SRS,B_{SRS}}$). The starting position $$k_0^{(p_i)}$$

is an index of the start subcarrier, and is determined by a set of RRC parameters. The allocated sounding frequency band refers to the number of subcarriers used for the SRS resource. The allocated sounding frequency band can be calculated as $$m_{SRS,B_{SRS}} \times N_{sc}^{RB},$$

where $m_{SRS,B_{SRS}}$ is the number of RBs (resource blocks) used for the SRS resource, and $$N_{sc}^{RB}$$

is the number of subcarriers in one RB (Resource Block) (e.g. equal to 12 subcarriers). The number of RBs ($m_{SRS,B_{SRS}}$) is determined by the RRC parameters $C_{SRS}$ and $B_{SRS}$ configured per SRS resource (see Table 1).

In the right part of FIG. 1 labeled as "(b) Partial frequency sounding", the frequency resources used for a SRS resource with SRS antenna port $p_i$ is determined by a new starting position $$k_0^{(p_i)} + k_{offset}$$

in frequency domain and a partial allocated sounding frequency band. The partial allocated sounding frequency band is within the full frequency band. The new starting position is obtained by adding an offset value $k_{offset}$ to the starting position $$k_0^{(p_i)}$$

used for the SRS resource with SRS antenna port $p_i$ for full frequency sounding. The offset value $k_{offset}$ is a number of subcarriers. The partial frequency band is obtained by multiplying a fraction (e.g.

$$\frac{1}{P_F},$$

where $P_F$ is a coefficient that is larger than 1 (e.g. 2, 4, or 8)) to the full frequency sounding band (i.e. the allocated frequency band used for the SRS resource transmission) and performing a round down of the multiplying product. If the full frequency sounding band is represented by $m_{SRS,B_{SRS}}$ (the number of RBs), the partial frequency band (used for the SRS resource for partial frequency sounding) can be represented by $m_P$ contiguous RBs, where $m_P$ is the largest integer that is equal to or smaller than $$\left\lfloor \frac{1}{P_F} m_{SRS,B_{SRS}} \right\rfloor, \text{ i.e. } m_P = rounddown\left(\left\lfloor \frac{1}{P_F} m_{SRS,B_{SRS}} \right\rfloor\right).$$

For example, if $$m_{SRS,B_{SRS}} = 32, P_F = 4, \text{ then } \left\lfloor \frac{1}{P_F} m_{SRS,B_{SRS}} \right\rfloor = 32/4 = 8, m_p = 8.$$

For another example, if $$m_{SRS,B_{SRS}} = 17, P_F = 4, \text{ then } \left\lfloor \frac{1}{P_F} m_{SRS,B_{SRS}} \right\rfloor = 17/4, m_P = 4.$$

Incidentally, the present disclosure is only related to the frequency resources used for the SRS resource while it is not related to the time resources used for the SRS resource. In other words, the time resources used for the SRS resource for "partial frequency sounding" are the same as those used for the SRS resource for "full frequency sounding", e.g. 1 OFDM symbol (that can be configured by RRC signaling).

For the frequency resources used for the SRS resource with SRS antenna port $p_i$ for "partial frequency sounding", it is necessary to indicate the starting position $$k_0^{(p_i)} + k_{offset}$$

(the subcarrier index of the starting subcarrier) in frequency domain and to indicate the frequency band $$m_P = rounddown\left(\left\lfloor \frac{1}{P_F} m_{SRS,B_{SRS}} \right\rfloor\right)$$

(e.g. by the number of subcarriers).

In principle, the starting position $$k_0^{(p_i)} + k_{offset}$$

in frequency domain and the frequency band $$m_P = rounddown\left(\left\lfloor \frac{1}{P_F} m_{SRS,B_{SRS}} \right\rfloor\right)$$

can be indicated by any of RRC signaling, MAC CE and DCI.

If they are configured by RRC signaling, the frequency band $$m_P = rounddown\left(\left\lfloor \frac{1}{P_F} m_{SRS,B_{SRS}} \right\rfloor\right)$$

can be directly configured by a new parameter $$m'_{SRS,B_{SRS}} = \frac{1}{P_F} m_P$$

(which can be implemented by reconfiguring the related parameters, e.g., $C_{SRS}$ and $B_{SRS}$ of the SRS resource) while the starting position $$k_0^{(p_i)} + k_{offset}$$

can be directly configured a new parameter $$k_0'^{(p_i)} = k_0^{(p_i)} + k_{offset}.$$

However, the configuration by RRC signaling is slow.

If they are indicated in a DCI, at least for periodic and semi-persistent SRS, the overhead of the DCI would be too large. In addition, a new dedicated DCI format is necessary. The partial frequency sounding targets SRS capacity enhancement for multi-user scenario with lower mobility and small delay spread. The multiplexing pattern of different SRS resources of different users is semi-statically changed. So, the starting position and the frequency band for the SRS resource for partial frequency sounding are not necessarily changed dynamically (e.g. by indication of DCI).

As a whole, it is not favorite to indicate the starting position and the frequency band for the SRS resource for partial frequency sounding by RRC signaling or by DCI.

MAC CE based indication of the starting position and the frequency band for the SRS resource for partial frequency sounding can make a good trade-off for flexibility and signaling overhead.

MAC CE based indication and update of the starting position (e.g. by indicating $k_{offset}$) and the frequency band (e.g. by indicating $P_F$) for the SRS resource for partial frequency sounding are discussed in detail as follows:

For the frequency band $$m_P = rounddown \left( \left\lfloor \frac{1}{P_F} m_{SRS,B_{SRS}} \right\rfloor \right)$$

for the SRS resource for partial frequency sounding, because the $m_{SRS,B_{SRS}}$ has been configured before the SRS (e.g. aperiodic SRS, semi-persistent SRS or periodic SRS) resource is scheduled or triggered, it is only necessary to indicate the parameter $P_F$ for the SRS resource that supports partial frequency sounding. For the starting position $$\left( k_0^{(p_i)} + k_{offset} \right)$$

for the SRS resource for partial frequency sounding, because the $$k_0^{(p_i)}$$

has been configured before the SRS (e.g. aperiodic SRS, semi-persistent SRS or periodic SRS) resource is scheduled or triggered, it is only necessary to indicate the parameter $k_{offset}$ for the SRS resource that supports partial frequency sounding. As a whole, it is only necessary to indicate $P_F$ and $k_{offset}$ for the SRS resource for partial frequency sounding.

A partial frequency sounding MAC CE is used to indicate or update the starting position (e.g. by indicating $k_{offset}$) and the frequency band (e.g. by indicating $P_F$) for partial frequency sounding. In the following description, the partial frequency sounding MAC CE is abbreviated as the MAC CE.

A SRS resource set consists of multiple SRS resources. So, the starting position (e.g. $k_{offset}$) and the frequency band (e.g. $P_F$) can be configured and/or indicated to a SRS resource set or to a SRS resource.

For $P_F$, multiple $P_F$ values can be configured for one SRS resource or one SRS resource set by RRC signaling. The base station (e.g. gNB) can select a certain $P_F$ value by indicating a $P_F$ value index with a $P_F$ field of the MAC CE.

For example, if $P_F$ values$\in \{1, 2, 4, 8\}$ (i.e. 4 $P_F$ values) are configured for a UE, a $P_F$ field with two $(2=\lceil \log_2(4) \rceil)$ bits can be contained in the MAC CE. For example, the 2 bits $P_F$ field can be defined by Table 2. The bit length of the $P_F$ field is determined by the number of $P_F$ values $(N_{P_F})$. In particular, the bit length of the $P_F$ field is the smallest integer that is equal to or larger than $\log_2(N_{P_F})$, i.e. roundup$(\log_2 (N_{P_F}))$. Incidentally, if the $P_F$ value is 1, the frequency band $$m_P = rounddown \left( \left\lfloor \frac{1}{P_F} m_{SRS,B_{SRS}} \right\rfloor \right) = m_{SRS,B_{SRS}}$$

(which means full frequency sounding).

TABLE 2

| Mapping between $P_F$ field and $P_F$ values | |
| --- | --- |
| $P_F$ field | $P_F$ value |
| 00 | 1 |
| 01 | 2 |
| 10 | 4 |
| 11 | 8 |

The $k_{offset}$ can be indicated by the number of resource blocks (RBs) $(N_{offset})$. That is, $$k_0'^{(p_i)} = k_0^{(p_i)} + k_{offset} = k_0^{(p_i)} + N_{offset} \times N_{sc}^{RB}, N_{offset} \in \{0, 1, \dots, 255\},$$

where $$N_{sc}^{RB}$$

(e.g. equal to 12) is the number of subcarriers per RB (resource block). When $N_{offset}$ is indicated by a 8 bits field, the possible values of $N_{offset}$ is 0 to 255. On the other hand, in order to ensure that the partial allocated sounding frequency band is within the full frequency band, the candidate values of $N_{offset}$ shall be no more than $$\frac{\hat{P}_F - 1}{\hat{P}_F} m_{SRS,B_{SRS}},$$

where $\hat{P}_F$ is the $P_F$ value indicated by the $P_F$ field.

Figure 2:
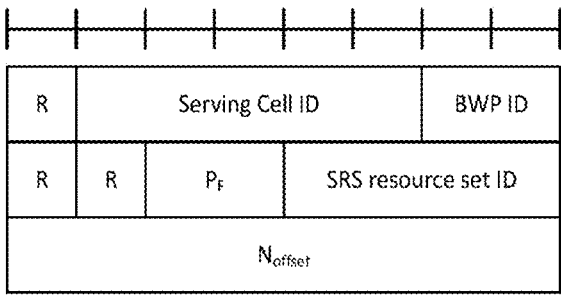
FIG. 2 illustrates a first example of partial frequency sounding MAC CE.

A first example of the MAC CE is illustrated in FIG. 2. The $P_F$ value is indicated by a 2 (i.e. roundup$(\log_2(N_{P_F}))=$ roundup$(\log_2(4))=2)$ bits field ($P_F$ field) and represents a $P_F$ value according to Table 2. The $N_{offset}$ value is indicated by a 8 bits field ($N_{offset}$ field) and represents the number of RBs. The $N_{offset}$ value (i.e. the number of RBs) can be an integer that is no more than $$\frac{\hat{P}_F - 1}{\hat{P}_F} m_{SRS,B_{SRS}}$$

$$N_{sc}^{RB}$$

selected from any of 0 to 255, where $\hat{P}_F$ is the $P_F$ value indicated by the $P_F$ field. In FIG. 2, the $N_{offset}$ value and the $P_F$ value are indicated to a SRS resource set indicated by a 4 bits SRS resource set ID field, where all SRS resources within the SRS resource set indicated by the SRS resource set ID field share the same $N_{offset}$ value and the same $P_F$ value indicated in the MAC CE. In FIG. 2, the Serving Cell ID field (with 5 bits) indicates the identity of the Serving Cell for which the MAC CE applies; the BWP ID field (with 2 bits) indicates a DL BWP for which the MAC CE applies; and the R field is reserved and set to 0.

Figure 3:
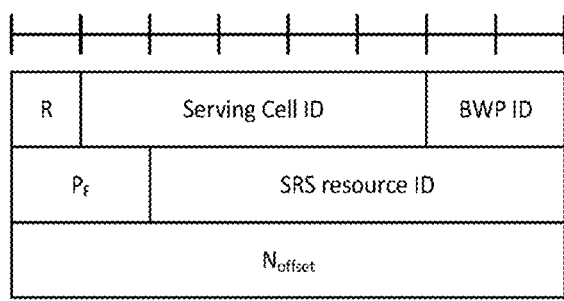
FIG. 3 illustrates a second example of partial frequency sounding MAC CE.

A second example of the MAC CE is illustrated in FIG. 3. The $P_F$ value is indicated by a 2 (i.e. roundup($\log_2(N_{P_F})$)= roundup($\log_2(4)$)=2) bits field ($P_F$ field) and represents a $P_F$ value according to Table 2. The $N_{offset}$ value is indicated by a 8 bits field ($N_{offset}$ field) and represents the number of RBs. The $N_{offset}$ value (i.e. the number of RBs) can be an integer that is no more than $$\frac{\hat{P}_F - 1}{\hat{P}_F} m_{SRS,B_{SRS}}$$

selected from any of 0 to 255 where $\hat{P}_F$ is the $P_F$ value indicated by the $P_F$ field. In FIG. 3, the $N_{offset}$ value and the $P_F$ value are indicated to a SRS resource indicated by a 6 bits SRS resource ID field, where the SRS resource indicated by the SRS resource ID field is indicated with the $N_{offset}$ value and the $P_F$ value indicated by the $N_{offset}$ field and the $P_F$ field of the MAC CE. In FIG. 3, the Serving Cell ID field (with 5 bits) indicates the identity of the Serving Cell for which the MAC CE applies; the BWP ID field (with 2 bits) indicates a DL BWP for which the MAC CE applies; and the R field is reserved and set to 0.

From the performance perspective, all SRS resources within a same SRS resource set prefer to be configured with the same $N_{offset}$ value and the same $P_F$ value. Therefore, the MAC CE illustrated in FIG. 3 can be understood as: the $N_{offset}$ value and the $P_F$ value indicated by the $N_{offset}$ field and the $P_F$ field of the MAC CE applies to all SRS resources within the SRS resource set containing the SRS resource indicated by the SRS resource ID field of the MAC CE.

The $k_{offset}$ can be alternatively indicated by the number of $m_P$ RBs, where $m_P$ is the largest integer that is equal to or smaller than $$\left\lfloor \frac{1}{P_F} m_{SRS,B_{SRS}} \right\rfloor.$$

That is, $$k_0'^{(p_i)} = k_0^{(p_i)} + k_{offset} = k_0^{(p_i)} + M_{offset} \times m_P \times N_{sc}^{RB},$$

$$M_{offset} \in \{0, 1, \dots, \hat{P}_F - 1\},$$

where (e.g. equal to 12) is the number of subcarriers per RB (resource block). The bit length of $M_{offset}$ field is determined by $\lceil \log_2(\max(P_F)) \rceil$. For example, if the maximum value of $P_F$ ($\max(P_F)$) is 8, $M_{offset}$ value can be indicated by a 3 (=$\log_2 8$) bits $M_{offset}$ field of the MAC CE illustrated in FIG. 4 or the MAC CE illustrated in FIG. 5. $\hat{P}_F$ is the $P_F$ value indicated by the $P_F$ field.

Figure 4:
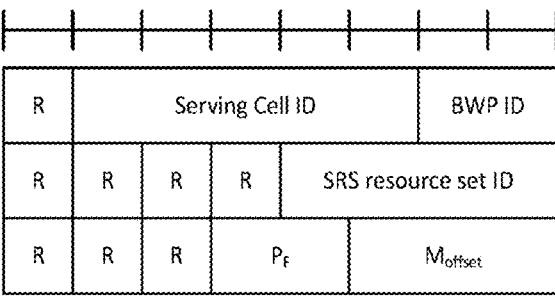
FIG. 4 illustrates a third example of partial frequency sounding MAC CE.

FIG. 4 differs from FIG. 2 only in that the $N_{offset}$ field (with 8 bits) is replaced with a $M_{offset}$ field (with 3 bits) and 5 R fields are added.

Similar to FIG. 2, in FIG. 4, the $M_{offset}$ value indicated by $M_{offset}$ field and the $P_F$ value indicated by $P_F$ field are indicated to the SRS resource set indicated by the SRS resource set ID field, where all SRS resources within the SRS resource set indicated by the SRS resource set ID field share the same $M_{offset}$ value and the same $P_F$ value.

Figure 5:
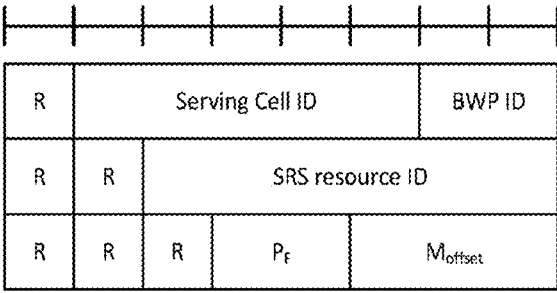
FIG. 5 illustrates a fourth example of partial frequency sounding MAC CE.

FIG. 5 differs from FIG. 3 only in that the $N_{offset}$ field (with 8 bits) is replaced with a $M_{offset}$ field (with 3 bits) and 5 R fields are added.

Similar to FIG. 3, in FIG. 5, the $M_{offset}$ value indicated by $M_{offset}$ field and the $P_F$ value indicated by $P_F$ field are indicated to the SRS resource indicated by the SRS resource ID field. Alternatively, the MAC CE illustrated in FIG. 5 can be understood as: the $M_{offset}$ value indicated by $M_{offset}$ field and the $P_F$ value indicated by $P_F$ field of the MAC CE applies to all SRS resources within the SRS resource set containing the SRS resource indicated by the SRS resource ID field.

When the UE receives the MAC CE (e.g. the partial frequency sounding MAC CE) indicating the start position (e.g. by the starting position offset $k_{offset}$) and the frequency band (e.g. by the $P_F$ value) for a SRS resource with SRS antenna port $p_i$ for partial frequency sounding, if the SRS (aperiodic SRS, semi-persistent SRS or periodic SRS) resource is scheduled or triggered with the allocated sounding frequency band of $m_{SRS,B_{SRS}}$ and the start position of $$k_0^{(p_i)},$$

the UE would transmit the SRS resource in $m_P$ contiguous RBs starting from $$k_0^{(p_i)} + k_{offset},$$

where $m_P$ is the largest integer that is equal to or smaller than $$\left\lfloor \frac{1}{P_F} m_{SRS,B_{SRS}} \right\rfloor.$$

FIG. 6 is a schematic flow chart diagram illustrating an embodiment of a method 600 according to the present application. In some embodiments, the method 600 is performed by an apparatus, such as a base unit. In certain embodiments, the method 600 may be performed by a processor executing program code, for example, a microcontroller, a microprocessor, a CPU, a GPU, an auxiliary processing unit, a FPGA, or the like.

The method 600 may include 602 receiving a MAC CE indicating a $P_F$ value and a value indicating a starting position offset $k_{offset}$ in frequency domain for a SRS resource; and 604 transmitting the SRS resource in $m_P$ contiguous resource blocks starting from $$k_0^{(p_i)} + k_{offset},$$

where $m_P$ is the largest integer that is equal to or smaller than $$\left\lfloor \frac{1}{P_F} m_{SRS,B_{SRS}} \right\rfloor,$$

wherein $m_{SRS,B_{SRS}}$ is the allocated sounding frequency band of the SRS resource configured by RRC signaling, and $$k_0^{(p_i)}$$

is the start position of the SRS resource determined by RRC signaling.

The $P_F$ value is one of multiple $P_F$ values configured by RRC signaling. The $P_F$ value is indicated by a $P_F$ field with a bit length determined by $\lceil \log_2(N_{P_F}) \rceil$, where $N_{P_F}$ is the number of the multiple $P_F$ values.

The starting position offset $k_{offset}$ may be determined by the number of resource blocks ($N_{offset}$) indicated by an $N_{offset}$ field, where $$k_{offset} = N_{offset} \times N_{sc}^{RB},$$

where $$N_{sc}^{RB}$$

is the number of subcarriers per resource block. $N_{offset}$ is no more than $$\frac{\hat{P}_F - 1}{\hat{P}_F} m_{SRS,B_{SRS}},$$

where $\hat{P}_F$ is the indicated $P_F$ value. Alternatively, the starting position offset $k_{offset}$ may be indicated by the number of $m_P$ resource blocks ($M_{offset}$) indicated by an $M_{offset}$ field, where $$k_{offset} = M_{offset} \times m_P \times N_{sc}^{RB},$$

where $$N_{sc}^{RB}$$

is the number of subcarriers per resource block, $M_{offset}$ is one of $0, 1, \ldots,$ and $\hat{P}_F - 1$, where $\hat{P}_F$ is the $P_F$ value indicated by the $P_F$ field.

The $P_F$ value and the value indicating $k_{offset}$ may apply to all SRS resources within the SRS resource set indicated by a SRS resource set ID field contained in the MAC CE. Alternatively, the $P_F$ value and the value indicating $k_{offset}$ may apply to the SRS resource indicated by a SRS resource ID field contained in the MAC CE. Further alternatively, the $P_F$ value and the value indicating $k_{offset}$ may apply to all SRS resources contained in the SRS resource set containing the SRS resource indicated by a SRS resource ID field contained in the MAC CE.

FIG. 7 is a schematic flow chart diagram illustrating a further embodiment of a method 700 according to the present application. In some embodiments, the method 700 is performed by an apparatus, such as a remote unit. In certain embodiments, the method 700 may be performed by a processor executing program code, for example, a micro-controller, a microprocessor, a CPU, a GPU, an auxiliary processing unit, a FPGA, or the like.

The method 700 may include 702 transmitting a MAC CE indicating a $P_F$ value and a value indicating a starting position offset $k_{offset}$ in frequency domain for a SRS resource; and 704 receiving the SRS resource in $m_P$ contiguous resource blocks starting from $$k_0^{(p_i)} + k_{offset},$$

where $m_P$ is the largest integer that is equal to or smaller than $$\left\lfloor \frac{1}{P_F} m_{SRS,B_{SRS}} \right\rfloor,$$

wherein $M_{SRS,B_{SRS}}$ is the allocated sounding frequency band of the SRS resource configured by RRC signaling, and $$k_0^{(p_i)}$$

is the start position of the SRS resource determined by RRC signaling.

The $P_F$ value is one of multiple $P_F$ values configured by RRC signaling. The $P_F$ value is indicated by a $P_F$ field with a bit length determined by $\lceil \log_2(N_{P_F}) \rceil$, where $N_{SC}^{RB}$ is the number of the multiple $P_F$ values.

The starting position offset $k_{offset}$ may be determined by the number of resource blocks ($N_{offset}$) indicated by an $N_{offset}$ field, where $$k_{offset} = N_{offset} \times N_{sc}^{RB},$$

where $$N_{sc}^{RB}$$

is the number of subcarriers per resource block, $N_{offset}$ is no more than $$\frac{\hat{P}_F - 1}{\hat{P}_F} m_{SRS, B_{SRS}},$$

where $\hat{P}_F$ is the indicated $P_F$ value. Alternatively, the starting position offset $k_{offset}$ may be indicated by the number of $m_P$ resource blocks ($M_{offset}$) indicated by an $M_{offset}$ field, where $$k_{offset} = M_{offset} \times m_P \times N_{sc}^{RB},$$

where $$N_{sc}^{RB}$$

is the number of subcarriers per resource block, $M_{offset}$ is one of 0, 1, . . . , and $\hat{P}_F - 1$, where $\hat{P}_F$ is the $P_F$ value indicated by the $P_F$ field.

The $P_F$ value and the value indicating $k_{offset}$ may apply to all SRS resources within the SRS resource set indicated by a SRS resource set ID field contained in the MAC CE. Alternatively, the $P_F$ value and the value indicating $k_{offset}$ may apply to the SRS resource indicated by a SRS resource ID field contained in the MAC CE. Further alternatively, the $P_F$ value and the value indicating $k_{offset}$ may apply to all SRS resources contained in the SRS resource set containing the SRS resource indicated by a SRS resource ID field contained in the MAC CE.

FIG. 8 is a schematic block diagram illustrating apparatuses according to one embodiment.

Referring to FIG. 8, the UE (i.e. the remote unit) includes a processor, a memory, and a transceiver. The processor implements a function, a process, and/or a method which are proposed in FIG. 6.

The UE comprises a receiver that receives a MAC CE indicating a $P_F$ value and a value indicating a starting position offset $k_{offset}$ in frequency domain for a SRS resource; and a transmitter that transmits the SRS resource in $m_P$ contiguous resource blocks starting from $$k_0^{(p_i)} + k_{offset},$$

wherein $m_P$ is the largest integer that is equal to or smaller than $$\left\lfloor \frac{1}{P_F} m_{SRS, B_{SRS}} \right\rfloor,$$

wherein $m_{SRS, B_{SRS}}$ is the allocated sounding frequency band of the SRS resource configured by RRC signaling, and $$k_0^{(p_i)}$$

is the start position of the SRS resource determined by RRC signaling.

The $P_F$ value is one of multiple $P_F$ values configured by RRC signaling. The $P_F$ value is indicated by a $P_F$ field with a bit length determined by $\lceil \log_2(N_{P_F}) \rceil$, where $N_{P_F}$ is the number of the multiple $P_F$ values.

The starting position offset $k_{offset}$ may be determined by the number of resource blocks ($N_{offset}$) indicated by an $N_{offset}$ field, where $$k_{offset} = N_{offset} \times N_{sc}^{RB},$$

where $$N_{sc}^{RB}$$

is the number of subcarriers per resource block. $N_{offset}$ is no more than $$\frac{\hat{P}_F - 1}{\hat{P}_F} m_{SRS, B_{SRS}},$$

where $\hat{P}_F$ is the indicated $P_F$ value. Alternatively, the starting position offset $k_{offset}$ may be indicated by the number of $m_P$ resource blocks ($M_{offset}$) indicated by an $M_{offset}$ field, where $$k_{offset} = M_{offset} \times m_P \times N_{sc}^{RB},$$

where $$N_{sc}^{RB}$$

is the number of subcarriers per resource block. $M_{offset}$ is one of 0, 1, . . . , and $\hat{P}_F - 1$, where $\hat{P}_F$ is the $P_F$ value indicated by the $P_F$ field.

The $P_F$ value and the value indicating $k_{offset}$ may apply to all SRS resources within the SRS resource set indicated by a SRS resource set ID field contained in the MAC CE. Alternatively, the $P_F$ value and the value indicating $k_{offset}$ may apply to the SRS resource indicated by a SRS resource ID field contained in the MAC CE. Further alternatively, the $P_F$ value and the value indicating $k_{offset}$ may apply to all SRS resources contained in the SRS resource set containing the SRS resource indicated by a SRS resource ID field contained in the MAC CE.

Referring to FIG. 8, the gNB (i.e. base unit) includes a processor, a memory, and a transceiver. The processors implement a function, a process, and/or a method which are proposed in FIG. 7.

The base unit comprises a transmitter that transmits a MAC CE indicating a $P_F$ value and a value indicating a starting position offset $k_{offset}$ in frequency domain for a SRS resource; and a receiver that receives the SRS resource in $m_P$ contiguous resource blocks starting from $$k_0^{(p_i)} + k_{offset},$$

where $m_P$ is the largest integer that is equal to or smaller than $$\left\lfloor \frac{1}{P_F} m_{SRS,B_{SRS}} \right\rfloor,$$

wherein $m_{SRS,B_{SRS}}$ is the allocated sounding frequency band of the SRS resource configured by RRC signaling, and $$k_0^{(p_i)}$$

is the start position of the SRS resource determined by RRC signaling.

The $P_F$ value is one of multiple $P_F$ values configured by RRC signaling. The $P_F$ value is indicated by a $P_F$ field with a bit length determined by $\lceil \log_2(N_{P_F}) \rceil$, where $N_{P_F}$ is the number of the multiple $P_F$ values.

The starting position offset $k_{offset}$ may be determined by the number of resource blocks ($N_{offset}$) indicated by an $N_{offset}$ field, where $$k_{offset} = N_{offset} \times N_{sc}^{RB},$$

where $$N_{sc}^{RB}$$

is the number of subcarriers per resource block, $N_{offset}$ is no more than $$\frac{\hat{P}_F - 1}{\hat{P}_F} m_{SRS,B_{SRS}},$$

where $\hat{P}_F$ is the indicated $P_F$ value. Alternatively, the starting position offset $k_{offset}$ may be indicated by the number of $m_P$ resource blocks ($M_{offset}$) indicated by an $M_{offset}$ field, where $$k_{offset} = M_{offset} \times m_P \times N_{sc}^{RB},$$

where $$N_{sc}^{RB}$$

is the number of subcarriers per resource block, $M_{offset}$ is one of $0, 1, \ldots,$ and $\hat{P}_F - 1$, where $\hat{P}_F$ is the $P_F$ value indicated by the $P_F$ field.

The $P_F$ value and the value indicating $k_{offset}$ may apply to all SRS resources within the SRS resource set indicated by a SRS resource set ID field contained in the MAC CE. Alternatively, the $P_F$ value and the value indicating $k_{offset}$ may apply to the SRS resource indicated by a SRS resource ID field contained in the MAC CE. Further alternatively, the $P_F$ value and the value indicating $k_{offset}$ may apply to all SRS resources contained in the SRS resource set containing the SRS resource indicated by a SRS resource ID field contained in the MAC CE.

Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:

receiving a radio resource control (RRC) signaling indicating a PF value and a value indicating a starting position offset $k_{offset}$ in frequency domain for a sounding reference signal (SRS) resource; and transmitting the SRS resource in $m_P$ contiguous resource blocks starting from $$k_0^{(p_i)} + k_{offset},$$

where $m_P$ is a largest integer that is equal to or smaller than $$\left\lfloor \frac{1}{P_F} m_{SRS,B_{SRS}} \right\rfloor,$$

wherein $m_{SRS,B_{SRS}}$ is an allocated sounding frequency band of the SRS resource configured by the RRC signaling, and $$k_0^{(p_i)}$$

is a start position of the SRS resource determined by the RRC signaling, wherein the starting position offset $k_{offset}$ is determined by at least one of:

a number of resource blocks ($N_{offset}$) indicated by an $N_{offset}$ field, where $$k_{offset} = N_{offset} \times N_{SC}^{RB}, \text{ where } N_{SC}^{RB}$$

is a number of subcarriers per resource block; or a number of $m_P$ resource blocks ($M_{offset}$) indicated by an $M_{offset}$ field, where $$k_{offset} = M_{offset} \times m_p \times N_{SC}^{RB}.$$

2. The method of claim 1, wherein the $P_F$ value is indicated by a $P_F$ field with a bit length determined by $\lceil \log_2(N_{P_F}) \rceil$, where the $N_{P_F}$ is a number of multiple $P_F$ values.

3. The method of claim 1, wherein $N_{offset}$ is no more than $$\frac{\hat{P}_F - 1}{\hat{P}_F} m_{SRS,B_{SRS}},$$

where $\hat{P}_F$ is the indicated $P_F$ value.

4. The method of claim 1, wherein $M_{offset}$ is one of 0, 1, . . . , and $\hat{P}_F - 1$, where $\hat{P}_F$ is the indicated $P_F$ value.

5. The method of claim 1, wherein the $P_F$ value and the value indicating $k_{offset}$ apply to all SRS resources within an SRS resource set indicated by a SRS resource set identifier (ID) field contained in the RRC signaling.

6. The method of claim 1, wherein the $P_F$ value and the value indicating $k_{offset}$ apply to the SRS resource indicated by a SRS resource identifier (ID) field contained in the RRC signaling.

7. The method of claim 1, wherein the $P_F$ value and the value indicating $k_{offset}$ apply to all SRS resources contained in an SRS resource set containing the SRS resource indicated by a SRS resource identifier (ID) field contained in the RRC signaling.

8. A user equipment (UE) for wireless communication, comprising:

at least one memory; and at least one processor coupled with the at least one memory and configured to cause the UE to:

receive a radio resource control (RRC) signaling indicating a $P_F$ value and a value indicating a starting position offset $k_{offset}$ in frequency domain for a sounding reference signal (SRS) resource; and transmit the SRS resource in $m_P$ contiguous resource blocks starting from $$k_0^{(p_i)} + k_{offset},$$

where $m_P$ is a largest integer that is equal to or smaller than $$\left\lfloor \frac{1}{P_F} m_{SRS,B_{SRS}} \right\rfloor,$$

wherein $m_{SRS,B_{SRS}}$ is an allocated sounding frequency band of the SRS resource configured by the RRC signaling, and $$k_0^{(p_i)}$$

is a start position of the SRS resource determined by the RRC signaling, wherein the starting position offset $k_{offset}$ is determined by at least one of:

a number of resource blocks ($N_{offset}$) indicated by an $N_{offset}$ field, where $$k_{offset} = N_{offset} \times N_{SC}^{RB}, \text{ where } N_{SC}^{RB}$$

is a number of subcarriers per resource block; or a number of $m_P$ resource blocks ($M_{offset}$) indicated by an $M_{offset}$ field, where $$k_{offset} = M_{offset} \times m_p \times N_{SC}^{RB}.$$

9. The UE of claim 8, wherein the $P_F$ value is one of multiple $P_F$ values configured by the RRC signaling.

10. The UE of claim 9, wherein the $P_F$ value is indicated by a $P_F$ field with a bit length determined by $\lceil \log_2(N_{P_F}) \rceil$, where the $N_{P_F}$ is a number of the multiple $P_F$ values.

11. The UE of claim 8, wherein $N_{offset}$ is no more than $$\frac{\hat{P}_F - 1}{\hat{P}_F} m_{SRS,B_{SRS}},$$

where $\hat{P}_F$ is the indicated $P_F$ value.

12. The UE of claim 8, wherein $M_{offset}$ is one of 0, 1, . . . , and $\hat{P}_F - 1$, where $\hat{P}_F$ is the indicated $P_F$ value.

13. The UE of claim 8, wherein the $P_F$ value and the value indicating $k_{offset}$ apply to all SRS resources within an SRS resource set indicated by a SRS resource set identifier (ID) field contained in the RRC signaling.

14. The UE of claim 8, wherein the $P_F$ value and the value indicating $k_{offset}$ apply to the SRS resource indicated by a SRS resource identifier (ID) field contained in the RRC signaling.

15. The UE of claim 8, wherein the $P_F$ value and the value indicating $k_{offset}$ apply to all SRS resources contained in an SRS resource set containing the SRS resource indicated by a SRS resource identifier (ID) field contained in the RRC signaling.

16. A processor for wireless communication, comprising:

at least one controller coupled with at least one memory and configured to cause the processor to:

receive a radio resource control (RRC) signaling indicating a $P_F$ value and a value indicating a starting position offset $k_{offset}$ in frequency domain for a sounding reference signal (SRS) resource; and transmit the SRS resource in $m_P$ contiguous resource blocks starting from $$k_0^{(p_i)} + k_{offset},$$

where $m_P$ is a largest integer that is equal to or smaller than $$\left\lfloor \frac{1}{P_F} m_{SRS,B_{SRS}} \right\rfloor,$$

wherein $m_{SRS,B_{SRS}}$ is an allocated sounding frequency band of the SRS resource configured by the RRC signaling, and $$k_0^{(p_i)}$$

is a start position of the SRS resource determined by the RRC signaling, wherein the starting position offset $k_{offset}$ is determined by at least one of:

a number of resource blocks ($N_{offset}$) indicated by an $N_{offset}$ field, where $$k_{offset} = N_{offset} \times N_{SC}^{RB}, \text{ where } N_{SC}^{RB}$$

is a number of subcarriers per resource block; or a number of $m_P$ resource blocks ($M_{offset}$) indicated by an $M_{offset}$ field, where $$k_{offset} = M_{offset} \times m_p \times N_{SC}^{RB}.$$

17. A method performed by a user equipment (UE), the method comprising:

transmitting a sounding reference signal (SRS) resource in $m_P$ contiguous resource blocks starting from $$k_0^{(p_i)} + k_{offset} \times \left\lfloor \frac{1}{P_F} m_{SRS,B_{SRS}} \right\rfloor \times N_{sc}^{RB},$$

where $m_P = \left\lfloor \frac{1}{P_F} m_{SRS,B_{SRS}} \right\rfloor$ and $k_{offset} \in \{0, 1, \dots, P_F - 1\}$, where $m_{SRS,B_{SRS}}$ is an allocated sounding frequency band of the SRS resource in a number of resource blocks configured by radio resource control (RRC) signaling, $P_F$ is a value configured by RRC signaling, $$N_{SC}^{RB}$$

is a number of subcarriers per resource block, and $$k_0^{(p_i)}$$

is a start position of the SRS resource determined by the RRC signaling without partial frequency sounding.

18. The method of claim 17, further comprising:

receiving a media access control (MAC) control element (CE) indicating the $P_F$ value and a value indicating the starting position offset $k_{offset}$ in frequency domain for the SRS resource.

19. The method of claim 18, wherein the $P_F$ value is indicated by a $P_F$ field with a bit length determined by $\lceil \log_2(N_{P_F}) \rceil$, where the $N_{P_F}$ is a number of multiple $P_F$ values.

20. The method of claim 17, further comprising:

receiving radio resource control (RRC) signaling indicating the $P_F$ value and a value indicating the starting position offset $k_{offset}$ in frequency domain for the SRS resource.

* * * * *